C. MOSS.
ARMORED PNEUMATIC TIRE.
APPLICATION FILED AUG. 2, 1912.
1,161,507.
Patented Nov. 23, 1915.
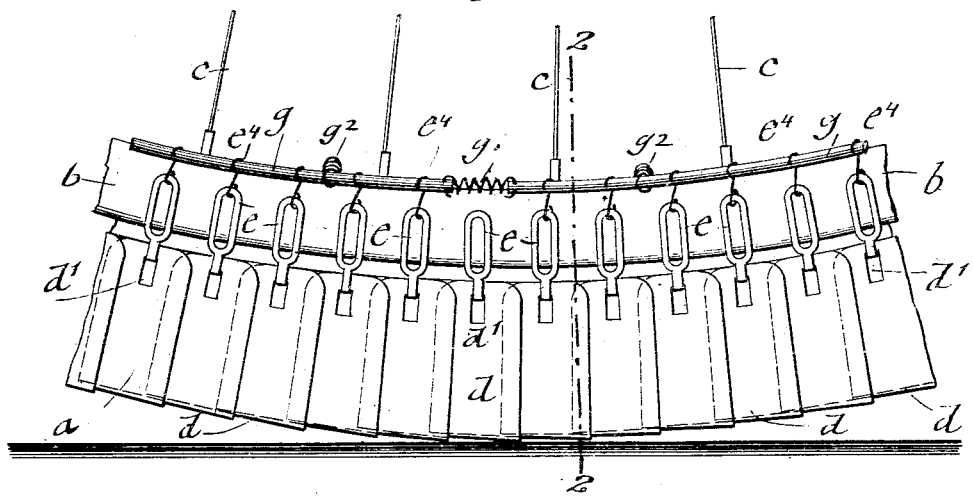
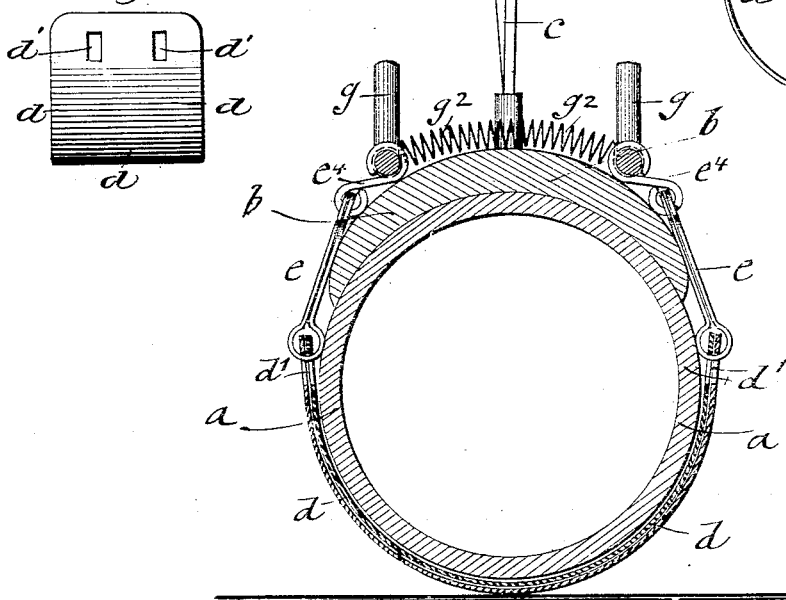

UNITED STATES PATENT OFFICE.

CHARLES MOSS, OF NEW YORK, N. Y.

ARMORED PNEUMATIC TIRE.

1,161,507.    Specification of Letters Patent.    Patented Nov. 23, 1915.

Application filed August 2, 1912. Serial No. 712,864.

*To all whom it may concern:*

Be it known that I, CHARLES MOSS, a citizen of the Kingdom of Roumania, residing in New York, in the borough of Manhattan, county and State of New York, have invented certain new and useful Improvements in Armored Pneumatic Tires, of which the following is a specification.

This invention relates to an improved armored pneumatic tire.

Many attempts have been made heretofore to protect the pneumatic tires of automobiles and other vehicles against puncturing or other injury by means of a so-called armor, that is to say, a metallic sheath which is placed around the tire for protecting the same. These attempts have not been very successful, owing to the rigidity of the armor, the increase in weight and the additional expense of the armor.

The object of this invention is to supply a light, strong and inexpensive armor for the pneumatic tires of automobile-wheels in which each section or scale thereof is readily detachable for being replaced in case of breakage, each scale overlapping the adjacent scales so as to form a double layer of sheet-metal around the tire and a double connection of each scale with the rim of the wheel; and for this purpose the invention consists of an armored pneumatic tire which is composed of a number of overlapping scales, each scale being provided with two slots, of which one registers with a slot of the underlapping portion of the adjacent scale at one side and the other with a slot of the overlapping portion of the adjacent scale at the other side, links passed through said registering slots, and means connected with the upper ends of said links for holding the scales of the armor firmly in position on the tire and rim.

The invention consists further of certain details of construction which will be fully described hereinafter and finally embodied in the claim.

In the accompanying drawing, Figure 1 represents a side-elevation of a portion of my improved armored pneumatic tire, Fig. 2 is a vertical transverse section on line 2, 2, Fig. 1, and Figs. 3 and 4 are respectively a detail side-elevation and an end-elevation of one of the protecting scales shown as detached from the tire.

Similar letters of reference indicate corresponding parts throughout the different figures of the drawing.

Referring to the drawing, $a$ represents a pneumatic tire, $b$ the rim for the same and $c$ the spokes for supporting the rim. The entire tire is inclosed or sheathed with an armor, which is formed of a number of individual, semicircular sections or scales $d$, which are provided at their opposite inner ends with two slots $d^1$ in each end. The scales $d$ are preferably made of thin spring-steel or other suitable metal and arranged in such a manner on the tire that each section or scale $d$ overlaps the adjacent section at one side and underlaps the adjacent section at the other side, in such a manner that the slots $d^1$ of one scale register or coincide with the slots of the adjacent underlapping and overlapping scales, as shown clearly in Figs. 1 and 2. The scales $d$ are made to surround the outer or tread portion of the tire and are attached to the rim $b$ by means of short chain-links $e$, which extend over the rim, and short steel-links $e^4$ to stout ring-shaped wires $g$ which are located on the rim $b$, one on each side of the spokes $c$, said wires being connected at their ends by helical springs $g^1$ and held on the rim by transverse helical springs $g^2$, as shown in Fig. 2. After the entire tire is covered with the overlapping scales, so that the exposed portions are inclosed by the same, the tire is pumped up, so that the outer perimeter of the same snugly hugs the tire and leaves no point of attack for puncturing or other injury. In case any one of the scales should break or crack by striking sudden obstructions on the road, it can readily be removed and a new one replaced by collapsing of the tire on opening the air-valve, so that the same yields sufficiently for permitting the removal of the split or broken scale and placing a new scale in position on the tire, after which the tire is pumped again and replaced into its former expanded position within the armor.

When the outer exposed portions of the scales are worn, they can be reversed by bringing the inner underlapping portions to the outside and the worn portions under the overlapping portions of the adjacent scales. The transverse springs permit the scales to yield under the pressure exerted thereon while the removing of split or worn scales and the replacing of the same by new scales can be easily accomplished in the manner described.

I claim:

A tire armor comprising an annular series of overlapping scales disposed on said tire, each scale having two pairs of slots near its opposite ends, and each scale overlapping one adjacent scale and underlapping the other adjacent scale and slots of one scale registering with adjacent slots of both adjacent scales, ring shaped wires on opposite sides, and transverse links connected with said ring shaped wires and engaging the registering slots of said lapping scales.

In testimony that I claim the foregoing as my invention I have signed my name in presence of two subscribing witnesses.

CHARLES MOSS.

Witnesses:
PAUL GOEPEL,
M. A. DILLON.

Copies of this patent may be obtained for five cents each, by addressing the "Commissioner of Patents, Washington, D. C."